US007344159B2

(12) United States Patent
Park

(10) Patent No.: US 7,344,159 B2
(45) Date of Patent: Mar. 18, 2008

(54) STEERING-COLUMN FIXING-PANEL ASSEMBLY OF COWL CROSSMEMBER

(75) Inventor: In-heum Park, Suwon-si (KR)

(73) Assignee: Hundai Mobis Co., Ltd., Seoul (KR)

( * ) Notice: Subject to any disclaimer, the term of this patent is extended or adjusted under 35 U.S.C. 154(b) by 343 days.

(21) Appl. No.: 11/142,308

(22) Filed: Jun. 2, 2005

(65) Prior Publication Data
US 2005/0275207 A1   Dec. 15, 2005

(30) Foreign Application Priority Data
Jun. 11, 2004   (KR)   ...................... 10-2004-0043180

(51) Int. Cl.
*B62D 1/16*   (2006.01)
(52) U.S. Cl. .................. 280/779; 280/750; 180/90
(58) Field of Classification Search ................ 280/779, 280/778, 750; 180/90, 311, 312; 296/70, 296/72, 192, 203.02
See application file for complete search history.

(56) References Cited
U.S. PATENT DOCUMENTS

| 5,564,769 | A  | * | 10/1996 | Deneau et al. ................ 296/72 |
| 6,250,678 | B1 | * | 6/2001  | Yoshinaka et al. ........... 280/752 |
| 6,305,733 | B1 | * | 10/2001 | Rahmstorf et al. ........... 296/70 |
| 6,315,347 | B1 |   | 11/2001 | Götz |
| 6,581,967 | B1 | * | 6/2003  | Logan et al. ................ 280/779 |
| 6,988,764 | B2 | * | 1/2006  | Matsutani ............... 296/193.02 |
| 7,128,360 | B2 | * | 10/2006 | Scheib et al. ................ 296/70 |
| 7,152,295 | B2 | * | 12/2006 | Goetz et al. ................ 29/434 |
| 2005/0093285 | A1 | * | 5/2005 | Lee et al. ................... 280/779 |
| 2006/0055163 | A1 | * | 3/2006 | Cho ........................... 280/784 |

FOREIGN PATENT DOCUMENTS

| JP | 8-085461 | 4/1996 |
| KR | 10-2002-0078283 | 10/2002 |
| KR | 10-2002-0080715 | 10/2002 |

OTHER PUBLICATIONS

English Language Abstract of JP 8-085461.
English Language Abstract of KR 10-2002-0080715.
English Language Abstract of KR 10-2002-0078283.

* cited by examiner

*Primary Examiner*—Paul N. Dickson
*Assistant Examiner*—Tiffany L. Webb
(74) *Attorney, Agent, or Firm*—Greenblum & Bernstein, P.L.C.

(57) ABSTRACT

A steering-column fixing-panel assembly of a cowl crossmember comprises a pair of first and second upper panels, and a single lower panel. Each of the upper panels includes a circular groove for use in the engagement of a crossbar of the cowl crossmember, inner and outer flanges formed at opposite lateral side edges thereof, and a coupling hole formed at the front portion thereof for the fixing of a steering column. The lower panel includes a circular groove for use in the engagement of the crossbar below the first and second upper panels; a protrusion configured to engage closely, at opposite lateral side edges thereof, with the inner flanges of the first and second upper panels; lower flanges, formed at opposite lateral side edges thereof, so as to engage closely with the outer flanges of the first and second upper panels; and a pair of coupling holes, formed at the front portion thereof, so as to communicate with the coupling holes of the first and second upper panels.

2 Claims, 7 Drawing Sheets

US 7,344,159 B2

STEERING-COLUMN FIXING-PANEL ASSEMBLY OF COWL CROSSMEMBER

RELATED APPLICATIONS

The present disclosure relates to subject matter contained in Korean Application No. 10-2004-43180, filed on Jun. 11, 2004, which is herein expressly incorporated by reference its entirety.

BACKGROUND OF THE INVENTION

1. Field of the Invention

The present invention relates in general to a steering-column fixing-panel assembly of a cowl crossmember for vehicles, and more particularly to a steering-column fixing-panel assembly of a cowl crossmember for vehicles, which comprises upper and lower panels fixed to a crossbar of the cowl crossmember using welding, and to which a steering column is coupled.

2. Description of the Related Art

Referring to FIGS. 1 to 3, in general, at the juncture between an engine compartment and a passenger compartment 5a defined in an automotive vehicle body 5 is installed a cowl crossmember 1, which serves as a reinforcing bar for fixing a steering system to the vehicle body 5.

To a crossbar 3 of the cowl crossmember 1 is fixed a steering column of the steering system as the steering column is coupled to a fixing panel assembly. The fixing panel assembly consists of upper and lower panels 9 and 10, which are coupled to each other using welding.

The upper and lower panels 9 and 10 are formed with circular grooves 6 for use in the engagement of the crossbar 3, respectively. Further, along opposite lateral side edges of the respective upper and lower panels 9 and 10 are formed flanges 7 for securing easy welding therebetween.

In this case, the upper and lower panels 9 and 10 are coupled to each other as their flanges 7 formed along the opposite lateral side edges thereof are welded to each other, then the steering column is coupled to the upper and lower panels 9 and 10. Such a structure, however, has some drawbacks in that, since the upper and lower panels 9 and 10 are fixed to the cowl crossmember 1 as they are welded to each other only at the opposite lateral side edges thereof, it exhibits a low structural rigidity, as well as a risk of generating vibration during operation of a steering wheel or resulting in breakage due to such vibration.

SUMMARY OF THE INVENTION

Therefore, the present invention has been made in view of the above problems, and it is an object of the present invention to provide a steering-column fixing-panel assembly of a cowl crossmember for enabling a steering column to be fixed to the cowl crossmember with an improved structural rigidity and a reduced risk of generating vibration.

In accordance with the present invention, the above and other objects can be accomplished by the provision of a steering-column fixing-panel assembly of a cowl crossmember comprising: a pair of first and second upper panels; and a single lower panel, wherein each of the first and second upper panels includes: a circular groove for use in the engagement of a crossbar of the cowl crossmember; inner and outer flanges formed at opposite lateral side edges thereof; and a coupling hole formed at a front portion thereof for the fixing of a steering column, and wherein the lower panel includes: a circular groove for use in the engagement of the crossbar below the first and second upper panels; a protrusion configured to engage closely, at opposite lateral side edges thereof, with the inner flanges of the first and second upper panels; lower flanges formed at opposite lateral side edges thereof so as to engage closely with the outer flanges of the first and second upper panels; and a pair of coupling holes formed at a front portion thereof so as to communicate with the coupling holes of the first and second upper panels.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Now, a preferred embodiment of the present invention will be explained with reference to the accompanying drawings.

Further, the present embodiment is given by way of illustration and example only, and is not intended to limit the range of the present invention. Multiple variations and modifications are possible through the technical teachings of the present invention.

Figure 1:
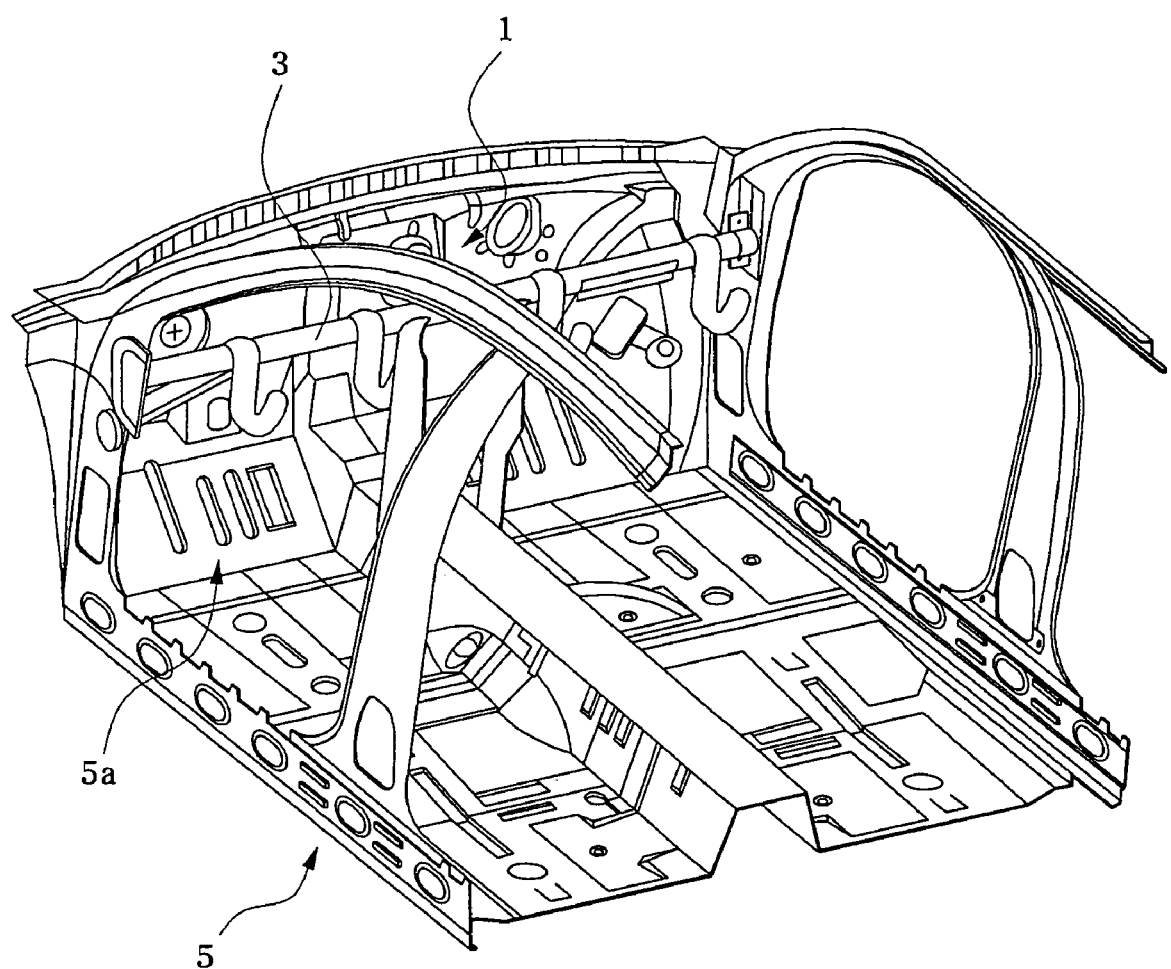
FIG. 1 is a perspective view illustrating a cowl crossmember of an automotive vehicle body.
Figure 2:
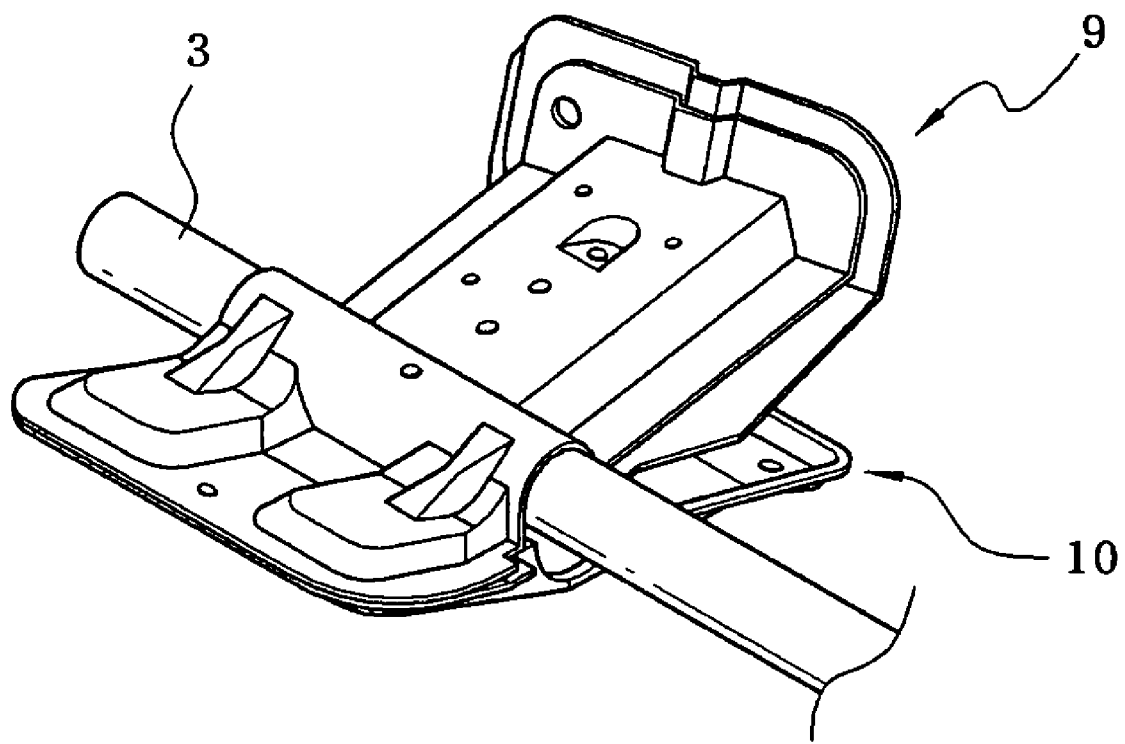
FIG. 2 is a perspective view illustrating a conventional steering-column fixing-panel assembly fixed to a cowl crossmember.
Figure 3:
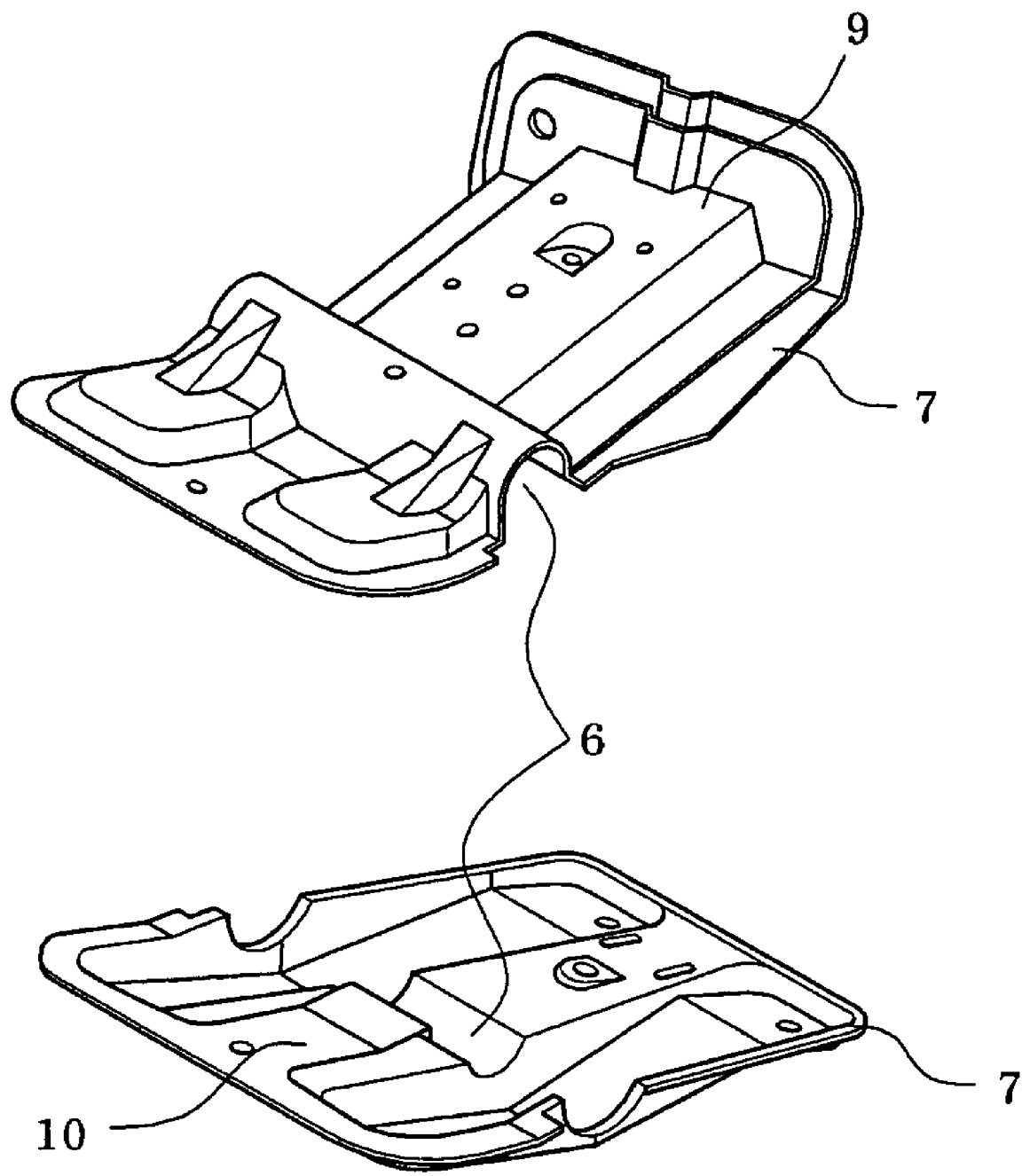
FIG. 3 is an exploded perspective view of the conventional steering-column fixing-panel assembly shown in FIG. 2.
Figure 4:
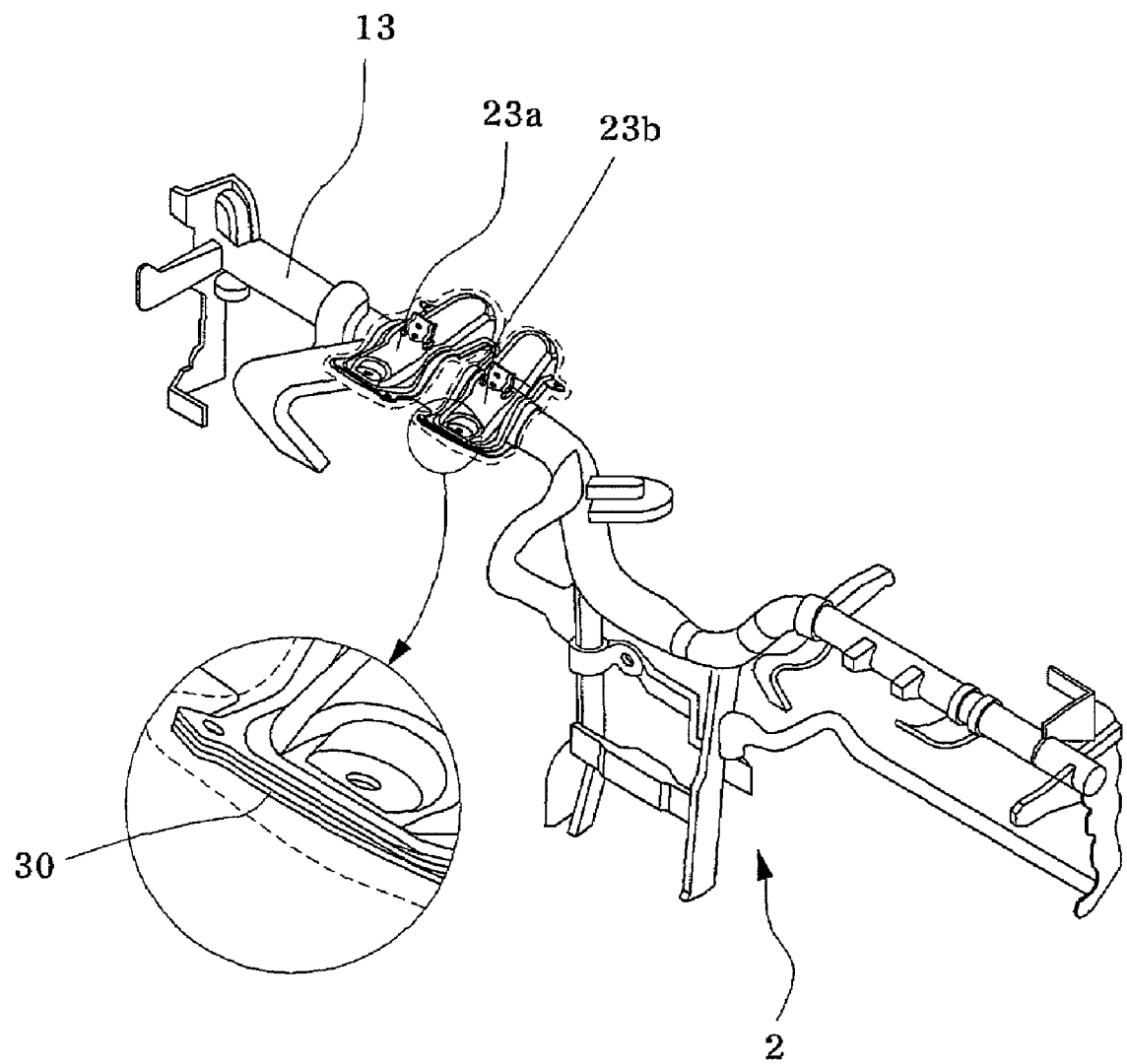
FIG. 4 is a perspective view illustrating a steering-column fixing-panel assembly in accordance with a preferred embodiment of the present invention, shown in a state wherein it is fixed to a crossbar provided in a cowl crossmember.
Figure 5:
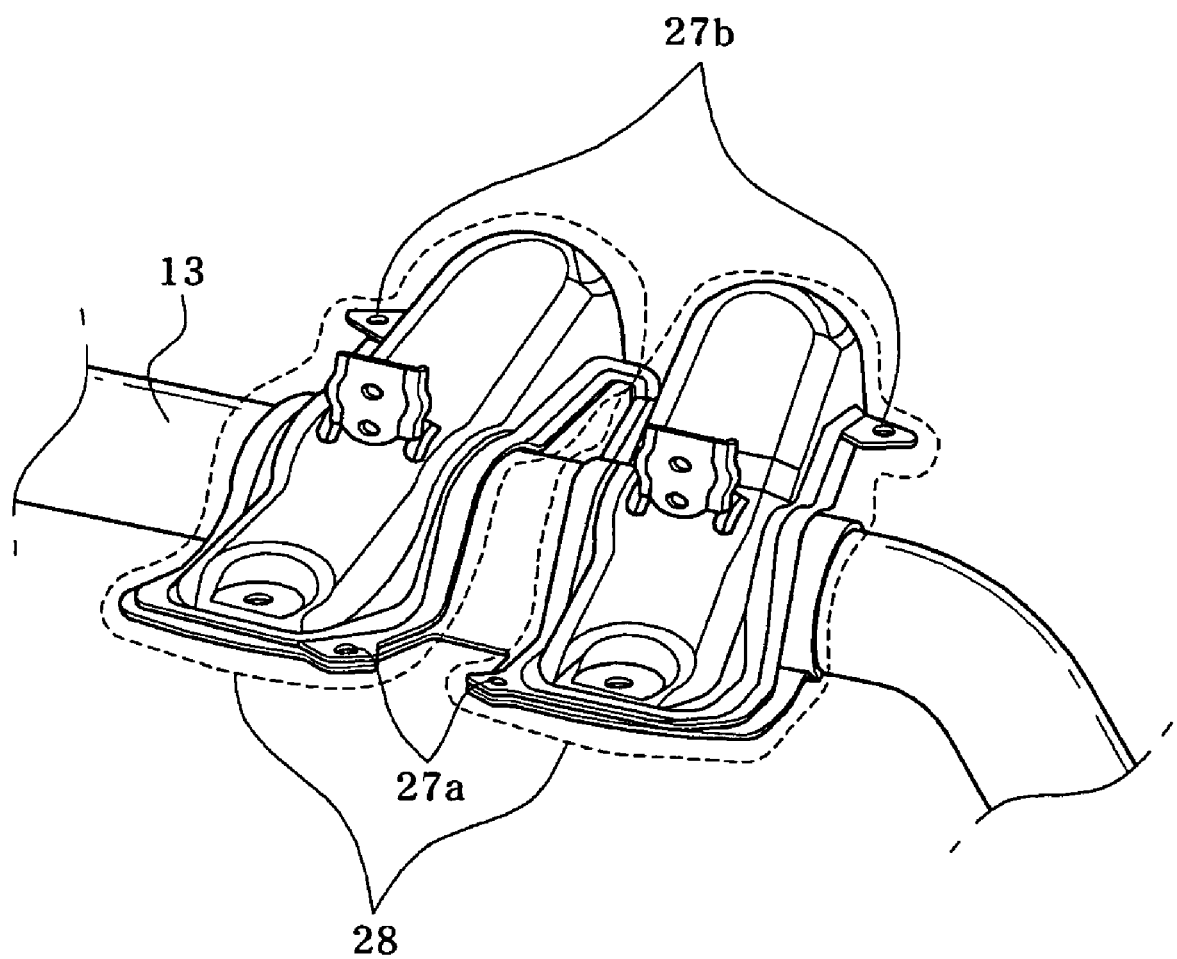
FIG. 5 is an assembled perspective view of the steering-column fixing-panel assembly shown in FIG. 4.
Figure 6:
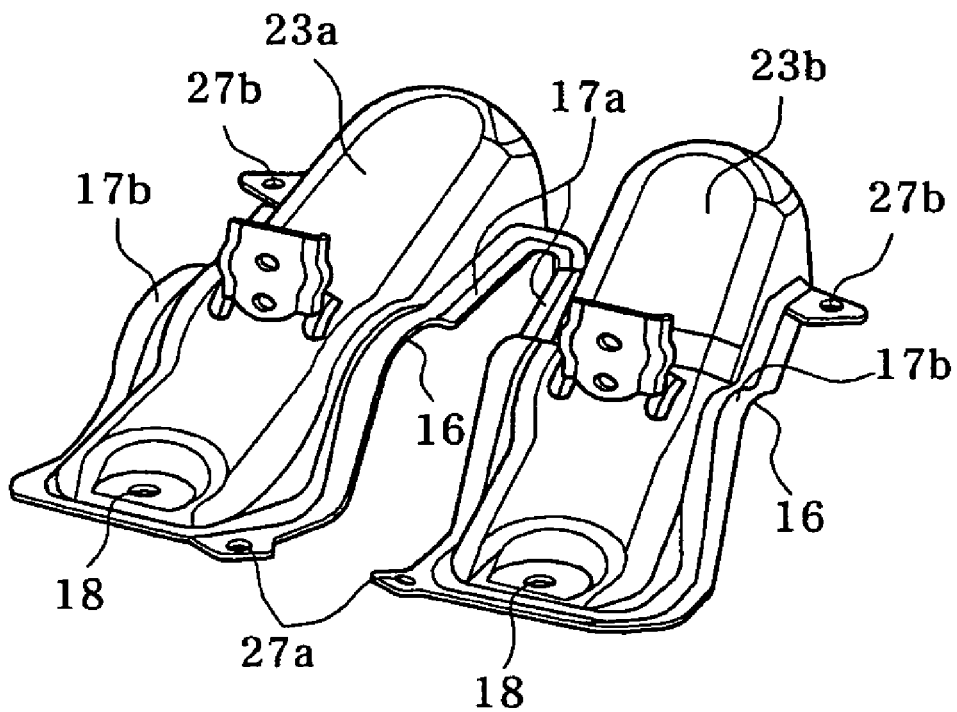
FIG. 6 is an exploded perspective view of the steering-column fixing-panel assembly shown in FIG. 4.
Figure 6:
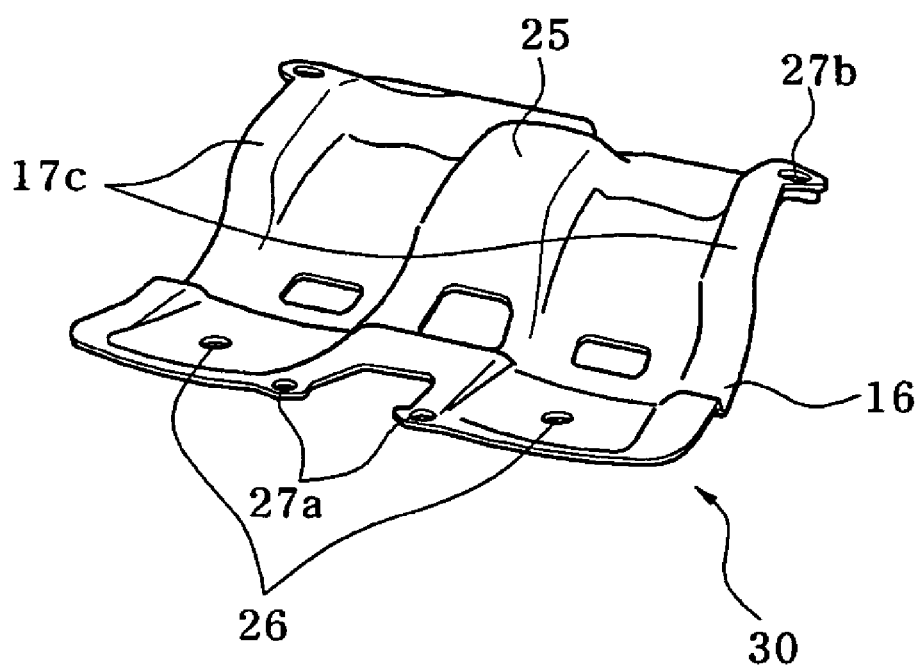
Figure 7:
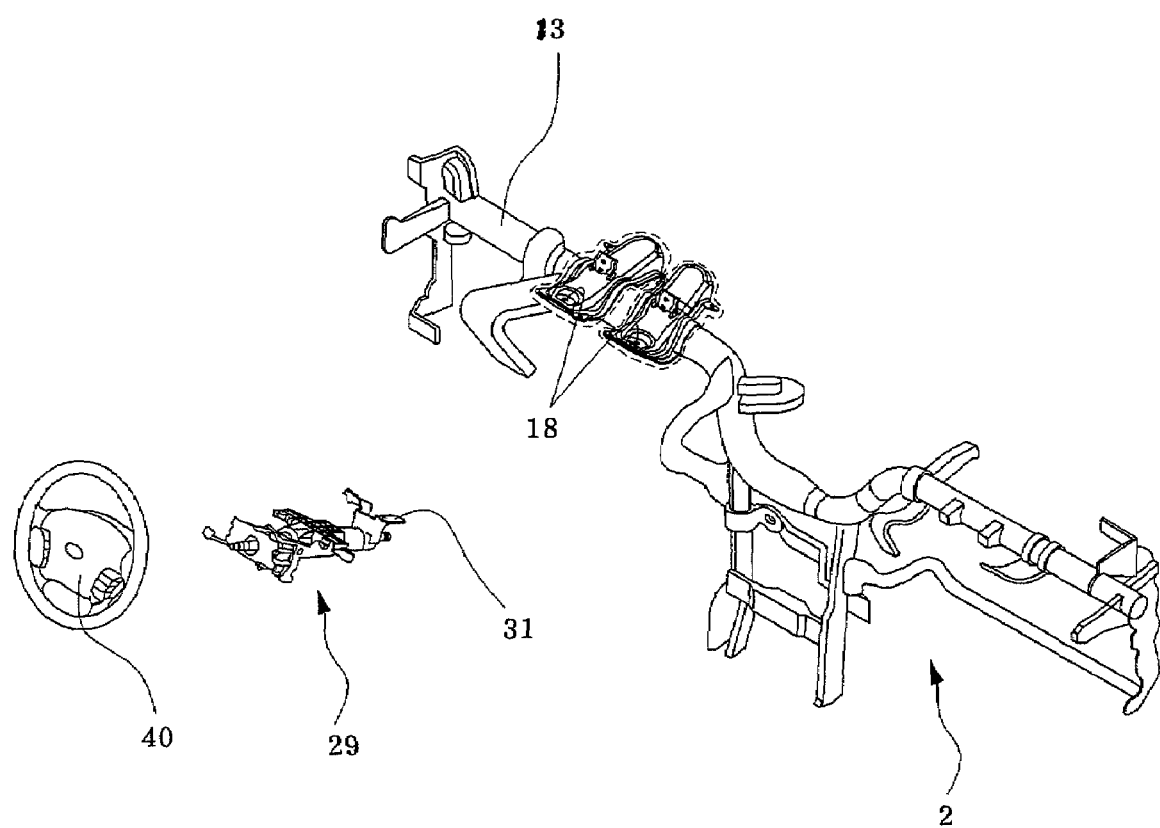
FIG. 7 is an exploded perspective view illustrating the coupling relationship between a steering column and the steering-column fixing-panel assembly in accordance with the preferred embodiment of the present invention.

FIG. 4 is a perspective view illustrating a steering-column fixing-panel assembly in accordance with a preferred embodiment of the present invention, shown in a state wherein it is fixed to a crossbar provided in a cowl crossmember. FIG. 5 is an assembled perspective view of the steering-column fixing-panel assembly shown in FIG. 4. FIG. 6 is an exploded perspective view of the steering-column fixing-panel assembly shown in FIG. 4. FIG. 7 is an exploded perspective view illustrating the coupling relationship between a steering column and the steering-column fixing-panel assembly in accordance with the preferred embodiment of the present invention.

As shown in the above drawings, the steering-column fixing-panel assembly of a cowl crossmember 2 according to the present invention comprises a pair of first and second upper panels 23a and 23b, and a single lower panel 30.

The first and second upper panels 23a and 23b are formed with circular grooves 16 for use in the engagement of a crossbar 13 of the cowl crossmember 2, respectively. Along opposite lateral side edges of the respective first and second upper panels 23a and 23b are formed flanges 17, and at the front portion of the respective first and second upper panels 23a and 23b are formed coupling holes 18 for use in the fixing of a steering column 29. Here, the flanges 17 consist of inner flanges 17a and outer flanges 17b.

Similar to the upper panels 23a and 23b, the lower panel 30 is formed with the circular groove 16 so that it is engaged to the crossbar 13 below the first and second upper panels 23a and 23b. Further, at the lower panel 30 is formed a protrusion 25 configured to engage closely, at opposite lateral side edges thereof, with the inner flanges 17a of the first and second upper panels 23a and 23b. Formed at opposite lateral side edges of the lower panel 30 are lower flanges 17c configured to engage closely with the outer flanges 17b of the first and second upper panels 23a and 23b. Furthermore, the lower panel 30 is formed at the front portion thereof with a pair of coupling holes 26, which communicate with the coupling holes 18.

Each of the first and second upper panels 23a and 23b is further formed at its front and rear portions with a pair of through-holes 27a and 27b. These through-holes 27a and 27b serve to allow welding jigs to be inserted therein while varying their positions.

Such through-holes 27a and 27b for use in the insertion of welding jigs are also formed at the lower panel 30 so that they communicate with the through-holes 27a and 27b of the first and second upper panels 23a and 23b.

Now, the operation and effects of the steering-column fixing-panel assembly of the cowl crossmember 2 according to the present invention will be explained.

Considering a procedure for fixing the first and second upper panels 23a and 23b, as well as the lower panel 30 to the crossbar 13 of the cowl crossmember 2: first, the circular groove 16 of the lower panel 30 is engaged upwardly to the crossbar 13, and then the circular groove 16 of the first upper panel 23a is engaged downwardly to the crossbar 13 above one side of the lower panel 30. Finally, the circular groove 16 of the second upper panel 23b is engaged to the crossbar 13 beside the first upper panel 23a.

In this case, the through-holes 27a and 27b of the first and second upper panels 23a and 23b coincide with the through-holes 27a and 27b of the lower panel 30; thus, welding jigs are inserted through the through-holes 27a and 28b. Thereby, after being firmly fixed to the crossbar 13, the first and second upper panels 23a and 23b are welded to the lower panel 30.

In addition to such welding using the welding jigs, the inner flanges 17a, formed along inner side edges of the first and second upper panels 23a and 23b, are welded to the opposite lateral side edges of the protrusion 25, which is centrally formed at the lower panel 30. Simultaneously, the outer flanges 17b, formed along outer side edges of the first and second upper panels 23a and 23b, are welded to the lower flanges 17c, formed along the opposite lateral side edges of the lower panel 30.

That is, the first and second upper panels 23a and 23b are welded to the lower panel 30 along a welding line 28 shown in FIG. 5.

Meanwhile, the first and second upper panels 23a and 23b are coupled to the lower panel 30 so that their coupling holes 18 and 26 coincide with each other, and through these holes 18 and 26 are inserted coupling portions 31 of the steering column 29 from below the lower panel 30, so as to be firmly coupled thereto.

During operation of the steering wheel 40, although the first and second upper panels 23a and 23b and the lower panel 30 are affected by both external force, such as torsion force, and axial force, the upper and lower panels 23a, 23b and 30 exert an enhanced structural rigidity since they are welded by an enlarged welding area compared to the prior art.

The fact that the first and second upper panels 23a and 23b are spaced apart from each other means that they are coupled to the lower panel 30 after removal of any unnecessary portion thereof. This enables such a panel assembly, having a minimum weight, to be coupled to the crossbar 13 of the cowl crossmember 2.

As apparent from the above description, the present invention provides a steering-column fixing-panel assembly of a cowl crossmember for allowing a steering column to be coupled to the cowl crossmember with an enhanced structural rigidity.

Further, according to the present invention, two identical upper panels are welded to a single lower panel, resulting in simplification in the manufacturing process of the upper panels.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A steering-column fixing-panel assembly of a cowl crossmember comprising:

first and second upper panels; and a single lower panel, wherein each of the first and second upper panels includes:

a semi-circular groove engagable with a crossbar of the cowl crossmember;

inner and outer flanges formed at opposite lateral side edges thereof, the inner flanges configured to closely engage with the crossbar; and a coupling hole formed at a front portion thereof to fix a steering column, and wherein the lower panel includes:

a semi-circular groove engagable with the crossbar below the first and second upper panels;

a protrusion configured to engage closely, at opposite lateral side edges thereof, with the inner flanges of the first and second upper panels;

lower flanges, formed at opposite lateral side edges thereof, so as to engage closely with the outer flanges of the first and second upper panels; and a pair of coupling holes, formed at a front portion thereof, so as to communicate with the coupling holes of the first and second upper panels.

2. The structure as set forth in claim 1, wherein each of the first and second upper panels further includes a pair of through-holes, which are formed at front and rear portions of the respective panels to receive welding jigs insertable therein while varying their left and right positions.

* * * * *